US012120244B2

(12) United States Patent
Galligan et al.

(10) Patent No.: US 12,120,244 B2
(45) Date of Patent: Oct. 15, 2024

(54) HUMAN READABLE CONTENT FOR DIGITAL SIGNATURES

(71) Applicant: United States of America as represented by the Secretary of the Navy, San Diego, CA (US)

(72) Inventors: Matthew Galligan, Mount Laurel, NJ (US); John P. Waxler, Dresher, PA (US); Nhan Nguyen, Huntingdon Valley, PA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 346 days.

(21) Appl. No.: 17/702,135

(22) Filed: Mar. 23, 2022

(65) Prior Publication Data

US 2023/0308286 A1    Sep. 28, 2023

(51) Int. Cl.
*H04L 9/32*    (2006.01)
*H04L 9/00*    (2022.01)

(52) U.S. Cl.
CPC ............ *H04L 9/3247* (2013.01); *H04L 9/006* (2013.01)

(58) Field of Classification Search
CPC ...... H04L 9/3247; H04L 9/006; H04L 9/0631
See application file for complete search history.

(56) References Cited

U.S. PATENT DOCUMENTS

| 6,085,320 | A | 7/2000 | Kaliski, Jr. | |
| 8,261,082 | B1 * | 9/2012 | Goldman | H04L 9/3247 |
| | | | | 713/180 |
| 8,281,120 | B2 | 10/2012 | Tsao | |
| 8,359,473 | B1 * | 1/2013 | Sorotokin | H04L 9/0866 |
| | | | | 713/180 |

(Continued)

FOREIGN PATENT DOCUMENTS

| CA | 3154393 | A1 * | 5/2021 | ............ B42D 25/23 |
| EP | 1393144 | B9 * | 8/2009 | ............ G06F 21/30 |
| EP | 3812945 | A1 * | 4/2021 | ........... G06F 21/645 |

OTHER PUBLICATIONS

DoC-NIST-FIPS-PUB-186-2-DSS (Year: 2000).*

(Continued)

*Primary Examiner* — Stephen T Gundry
(74) *Attorney, Agent, or Firm* — Naval Information Warfare Center, Pacific; Kyle Eppele; J. Eric Anderson (57) ABSTRACT

A method for increasing validity of digital signatures comprising: receiving a request from a browser to have a user apply a digital signature to a document; verifying that the document complies with a predefined ruleset (e.g., prescribing font colors); presenting the user with the document on a user-computer interface in such a way that the document's entire content is completely reviewable by the user only if the document complies with the predefined ruleset; upon receiving instruction from the user to sign the document, generating a digital signature according to Advanced Encryption Standard (AES) public key infrastructure (PKI) that protects the document in its entirety, as presented to the (Continued)

user in the previous step; enabling the user to perform one or more of printing, sharing, and saving the digitally-signed document in a memory store; and sending the digitally-signed document with the newly-generated signature to the browser.

15 Claims, 5 Drawing Sheets

(56) References Cited

U.S. PATENT DOCUMENTS

| | | | | |
|---|---|---|---|---|
| 8,713,322 | B2* | 4/2014 | Pravetz | G06F 21/64 |
| | | | | 713/176 |
| 9,544,149 | B2* | 1/2017 | Follis | H04L 9/3247 |
| 9,613,016 | B2* | 4/2017 | Pravetz | G06F 40/106 |
| 9,853,818 | B2* | 12/2017 | Oswalt | H04L 9/3247 |
| 10,530,577 | B1* | 1/2020 | Pazhoor | H04L 9/3247 |
| 10,880,093 | B1* | 12/2020 | Rakowicz | G06Q 50/167 |
| 11,354,660 | B1* | 6/2022 | Griffin | G06Q 20/38215 |
| 11,392,756 | B2* | 7/2022 | Hayslett | G06F 40/205 |
| 11,626,986 | B1* | 4/2023 | Horoszczak | H04L 9/088 |
| | | | | 705/51 |
| 11,777,744 | B2* | 10/2023 | Li | H04L 9/3247 |
| | | | | 713/156 |
| 11,790,067 | B1* | 10/2023 | Lindley | H04L 9/3231 |
| | | | | 713/182 |
| 2002/0038290 | A1* | 3/2002 | Cochran | G06Q 10/10 |
| | | | | 705/50 |
| 2004/0225884 | A1* | 11/2004 | Lorenzini | H04L 9/3247 |
| | | | | 713/176 |
| 2007/0043949 | A1* | 2/2007 | Bugbee | H04L 9/3247 |
| | | | | 713/176 |
| 2010/0287378 | A1* | 11/2010 | Goldman | H04L 9/3247 |
| | | | | 713/176 |
| 2014/0019761 | A1* | 1/2014 | Shapiro | H04L 9/3247 |
| | | | | 713/176 |
| 2014/0032912 | A1* | 1/2014 | Hardy | H04N 1/32144 |
| | | | | 713/176 |
| 2014/0164542 | A1* | 6/2014 | McCabe | G06Q 10/10 |
| | | | | 709/206 |
| 2014/0304515 | A1* | 10/2014 | Feuerman | H04L 63/123 |
| | | | | 713/176 |
| 2015/0143219 | A1* | 5/2015 | McCabe | G06Q 10/10 |
| | | | | 715/224 |
| 2015/0332178 | A1* | 11/2015 | Sorotokin | H04L 63/10 |
| | | | | 705/59 |
| 2016/0048696 | A1* | 2/2016 | Follis | G06F 21/645 |
| | | | | 726/28 |
| 2016/0127131 | A1* | 5/2016 | Tenenboym | H04L 9/3247 |
| | | | | 713/176 |
| 2016/0132693 | A1* | 5/2016 | Kumar | G06F 21/16 |
| | | | | 726/28 |
| 2017/0083867 | A1* | 3/2017 | Saxena | G06Q 10/103 |
| 2017/0116597 | A1* | 4/2017 | Bargagli | G06Q 20/3276 |
| 2017/0345394 | A1* | 11/2017 | Bansal | H04L 63/0838 |
| 2018/0006825 | A1* | 1/2018 | Saxena | H04L 9/3226 |
| 2019/0394045 | A1* | 12/2019 | Talwar | G06F 40/197 |
| 2021/0319517 | A1* | 10/2021 | Aringdale | G06F 3/0482 |
| 2023/0104126 | A1* | 4/2023 | So | H04L 9/3268 |
| | | | | 713/156 |
| 2023/0134056 | A1* | 5/2023 | Alvord | G06N 3/09 |
| | | | | 715/224 |
| 2023/0214502 | A1* | 7/2023 | Hadi | G06F 40/117 |
| | | | | 726/30 |
| 2023/0237349 | A1* | 7/2023 | Donoho | G06N 5/022 |
| | | | | 706/46 |
| 2023/0336352 | A1* | 10/2023 | Krosuri | H04L 9/3228 |
| 2024/0037284 | A1* | 2/2024 | Almgren | G06F 21/57 |
| 2024/0078306 | A1* | 3/2024 | Gasparri | G06F 21/64 |
| 2024/0104299 | A1* | 3/2024 | Stratton | G06F 21/31 |
| 2024/0249015 | A1* | 7/2024 | Czerwinski | G06F 21/6227 |
| 2024/0265147 | A1* | 8/2024 | Kovach | G06F 21/64 |

OTHER PUBLICATIONS

DOCUSIGN; Digital signature FAQs; https://www.docusign.com/how-it-works/electronic-signature/digital-signature/digital-signature-faq; 2022.

* cited by examiner

Signature Request: SOME INTERESTING DOCUMENT TITLE 3 text blocks
2 images

Print    Email    Sign    Reject

HUMAN READABLE CONTENT FOR DIGITAL SIGNATURES

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil. Reference Navy Case Number 210956.

BACKGROUND OF THE INVENTION

Currently, when data (e.g., a portable document format (PDF) document, website, etc.) is digitally signed, most users assume that they are signing the entire document or website. This is however not the case. The signed data may be a subset of the information displayed, a mutation of the displayed data, or data that is totally hidden from the signer. Currently, the signer's computer receives the data to be signed and there is no uniform format that the computer receives. Often there is no reasonable way to even represent to the user what is being signed (as in the case of a byte stream, hash, etc). Perhaps more distressing is that in recent years, previous web-based digital signature methods have become outdated except for native applications that must be installed on a system ahead-of-time.

When a document is physically signed it relies on the fact that a physical signature is hard to reproduce and is difficult to transfer from one piece of paper (or other medium that is being signed) to another. However, when signing a multiple page document there is a risk that one of the unsigned pages are replaced and presented as the original document. This allows the person holding the signed document to misrepresent what was signed. To combat this each page of a physical document can be signed or initialed and all parties participating in the agreement can have their own copy of the signed document. In a physical-signing scenario the signer may fully read each piece of the document the signer is signing, and may retain a copy of his/her signed information for later verification.

In the world of digital signatures, generally only one signature is required for the entire document. What data that signature represents is entirely up to the creator of the document/electronic system. Generally speaking, the data in the document is hashed or otherwise reduced down to a manageable chunk of data then encrypted with the user's private key (e.g., from a smart card). The problem in general is that the user has absolutely no idea or control over what is actually being signed and the creator can omit or add whatever he/she wants without the user knowing, or having "their own copy" of the signature. The problem is, as stated previously, that the signer is not presented with the data he/she is signing. For example, the following order of events could happen:

1. A web page presents text describing an agreement or contract between the web site owner and the web site user.
2. The web site user is asked to digitally sign the agreement.
3. The user consents to sign and data is sent from the web site to the user's web browser.
   a. This data may or may not be the textual data the web user just reviewed.
4. A pop up appears (from the web browser) asking the user to sign with the user's digital certificate.
5. The user was happy with the information that was presented so the user clicks 'sign'.
   a. The user does not realize that the textual data the user read on the website is different from the data that was sent to the user's browser. In reality the user has no idea what the user is agreeing to.
6. The website owner now has a signed agreement that may differ entirely from what was displayed to the user, as well as the only true records of what was presented, and signed.
7. Put simply, the electronic system owner has total control over the records surrounding the signature, and can chose to have the records reflect a malicious transaction.
8. Additionally a third party could change the information pre-signature and potentially neither the system owner nor the user would be aware of the deception. Another obvious flawed implementation is where a user is presented with a digital pen and surface and asked to sign a document on the screen (e.g., at retail establishments, health care providers, etc.). In reality, there is absolutely no technical reason that what the user sees is what the user is signing and the possibility for misuse or deception is quite high. There is a need for a more robust, verifiable, and transparent means for digitally signing data.

SUMMARY

Disclosed herein is a method for increasing validity of digital signatures comprising the following steps. The first step provides for receiving, with an operating system running on a user's computer, a request from a browser to have the user apply a digital signature to a document. Another step provides for verifying that the document complies with a predefined ruleset before the user is given an opportunity to apply the digital signature. The predefined ruleset prescribes at least font colors. Another step provides for declining to present the document to the user for the digital signature if the document does not comply with the predefined ruleset. Another step provides for presenting the user with the document on a user-computer interface in such a way that the document's entire content is completely reviewable by the user if the document complies with the predefined ruleset. The next step provides for generating, upon receiving instruction from the user to sign the document, a digital signature according to Advanced Encryption Standard (AES) public key infrastructure (PKI) that protects the document in its entirety, as presented to the user in the previous step. Another step provides for enabling the user to perform one or more of printing, sharing, and saving the digitally-signed document in a memory store. Another step provides for sending the digitally-signed document with the newly-generated signature to the browser.

An embodiment of the method for increasing validity of a digital signature is also disclosed herein as comprising the following steps. The first step provides for loading a configuration file on an operating system, wherein the configuration file is configured to force AES PKI on any document digitally signed by a user. The next step provides for receiving with an operating system, a request to have the user apply a digital signature to a given document. The next step provides for verifying that the given document complies with a predefined ruleset before the user is given an opportunity to apply the digital signature. In this embodiment, the predefined ruleset prescribes font size, color, and legibility standards and prohibits inclusion of any data in the given document that is not explicitly defined and allowed by the predefined ruleset. The next step provides for declining to present the given document to the user for the digital signature if the given document does not comply with the predefined ruleset. The next step provides for presenting the user with the given document on a user-computer interface in such a way that the given document's entire content is completely reviewable by the user if the given document complies with the predefined ruleset. The next step provides for generating, upon receiving instruction from the user to sign the given document, a digital signature according to PKI that protects the given document in its entirety, as presented to the user in the previous step. The next step provides for enabling the user to perform one or more of printing, sharing, and saving the digitally-signed document in a memory store. The next step provides for sending the digitally-signed document to the browser alongside the newly-generated signature.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed methods below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Figure 1:
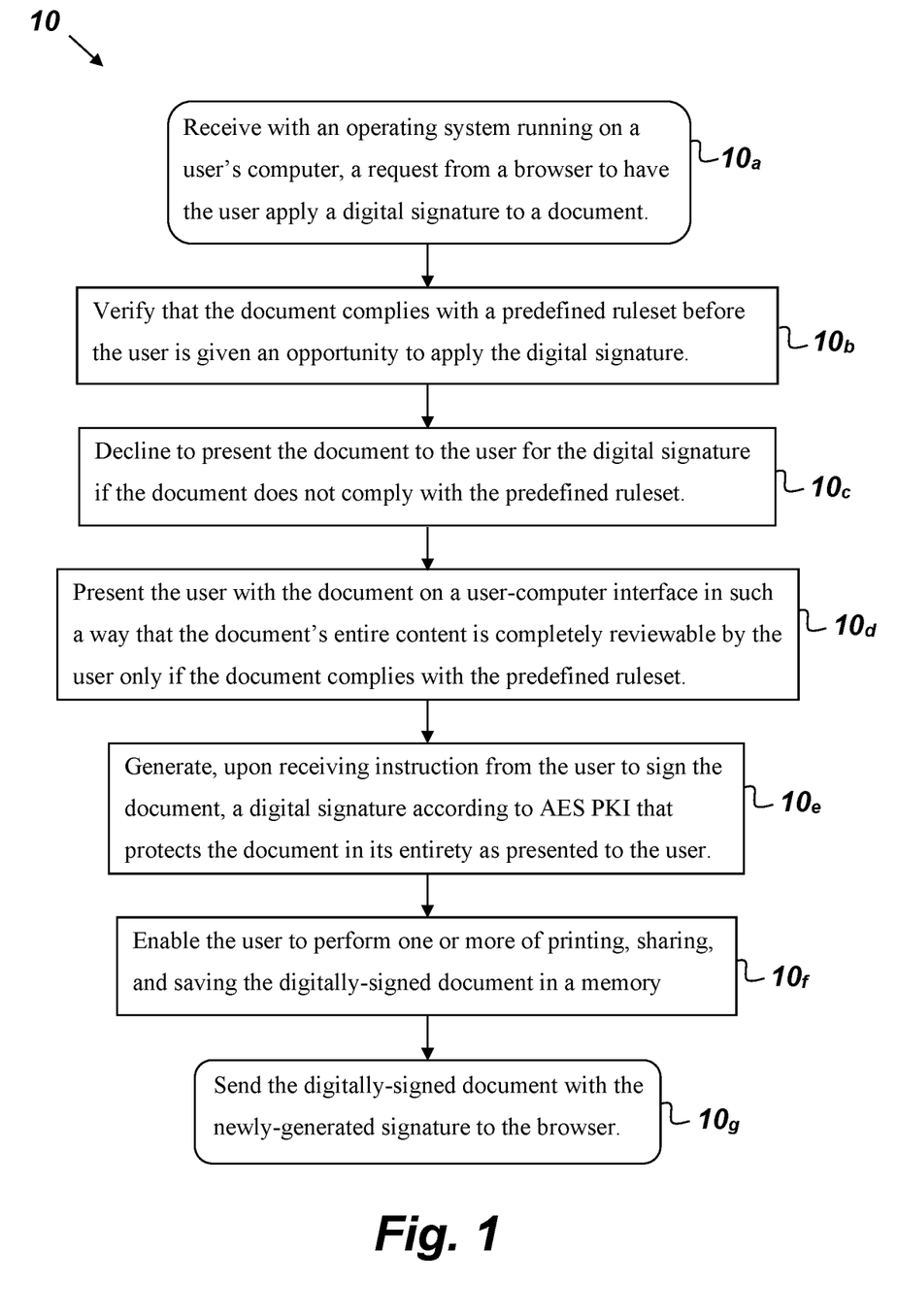
FIG. 1 is a flowchart of a method for increasing validity of a digital signature.

FIG. 1 is a flowchart of a method 10 for increasing validity of a digital signature that comprises, consists of, or consists essentially of the following steps. The first step $10_a$ provides for receiving, with an operating system running on a user's computer, a request from a browser to have the user apply a digital signature to a document. Another step $10_b$ provides for verifying that the document complies with a predefined ruleset before the user is given an opportunity to apply the digital signature. The predefined ruleset prescribes at least font colors. Another step $10_c$ provides for declining to present the document to the user for the digital signature if the document does not comply with the predefined ruleset. Another step $10_d$ provides for presenting the user with the document on a user-computer interface in such a way that the document's entire content is completely reviewable by the user if the document complies with the predefined ruleset. The next step $10_e$ provides for generating, upon receiving instruction from the user to sign the document, a digital signature according to AES PKI that protects the document in its entirety, as presented to the user in the previous step. Another step $10_f$ provides for enabling the user to perform one or more of printing, sharing, and saving the digitally-signed document in a memory store. Another step $10_g$ provides for sending the digitally-signed document with the newly-generated signature to the browser.

Method 10 enables a user/signer to review what he/she is digitally signing and reduces the possibility of deception. Method 10 may be implemented by a signing tool (i.e., on the application layer) or below (example: Operating System). According to the steps of an embodiment of method 10, before any piece of data is digitally signed the data will be presented to the user in a standardized way. This will allow the user to review exactly what he/she is signing before signing it, thus reducing the risk that a "bait and switch" attack occurs where the user reviews the data being signed, unknowingly applies his/her signature to a completely different piece of data. This type of attack/deception is incredibly simple to execute and currently there is no real defense against this sort of attack.

Method 10 may be used with any signature algorithm and ensures that the signer is presented with exactly what he/she is considering signing in a way that he/she can review and be assured that there is no deception present. Additionally, method 10 can protect against "lazy documents" that are not properly configured for signing such that after signing a document one can change the content of the document. In a properly created digital document, changing its content after it is signed should be prohibited, since the values should be backed by the signature. One embodiment of method 10 may be implemented during the $4^{th}$ event described in the background section where the popup appears asking for a digital signature, then, according to the steps of method 10, the entire document that is to be signed would need to be presented to the user in a human reviewable format so the user knows exactly what is being signed.

With respect to a document that needs to be signed, limiting its content based on specific rules for signature through the use of AES PKI is a novel technical approach to the long-standing problem. In one embodiment of method 10, a medical provider/employer/etc. may be allowed to access one's information, with PKI such that it is not spoofable, but only according to hard and inescapable rules for how one's data can be shared and how long it will remain with the medical provider/employer/etc. As a result, compliant systems would be unable to connect to non-compliant systems and share records such that when things were spread across the network, the initial lease/contract would be enforced and non-permitted sharing would be technically impossible.

Embodiments of the predefined ruleset can define text size and color, legibility (e.g. the whole document can't be in Pt. 1 subscript, or white on white, or in weird fonts). The predefined ruleset may also establish rules regarding text ambiguity/encoding to prevent ambiguities from being introduced into the document through extended character sets or even some fonts where characters become ambiguous. The predefined ruleset may also place restrictions on artifact formats (e.g. if there are supporting images for a document, minimum quality standards can be imposed, or if there is for example an audio excerpt standardizing it's format would be ideal). The predefined ruleset may also exclude any data that is not explicitly defined and included in the ruleset. This can have a desirable side-effect of forcing document creators to write things plainly. Method 10 enforces a hard technical limitation that you can't sign what you can't see.

Method 10 may be implemented as software as part of a computer system that allows for an end user to have a high confidence in what exactly they are digitally signing. Digital signatures may be done with user-defined keys, smart cards, soft certificates, electronic pen, or other means. Embodiments of method 10 implement a software interface and data standard to allow for other software, systems, or users to present a set of documents to be digitally signed. In general, the interface and data standard may be adopted to ensure that data can be kept consistent, understandable, and presented similarly or identically across multiple different implementations.

In general, the data format standard limits the possible types of data that can be presented to a user and keeps things consistent such that the user can view them in a standardized way agreed upon by the implementation. For example a user might be presented text and images as part of an implementation, and method 10 ensures that the text and images have technical parameters attached to them such that "invisible text", "microscopic fine print" or images that are overly small/large/blurry are impossible.

Figure 2:
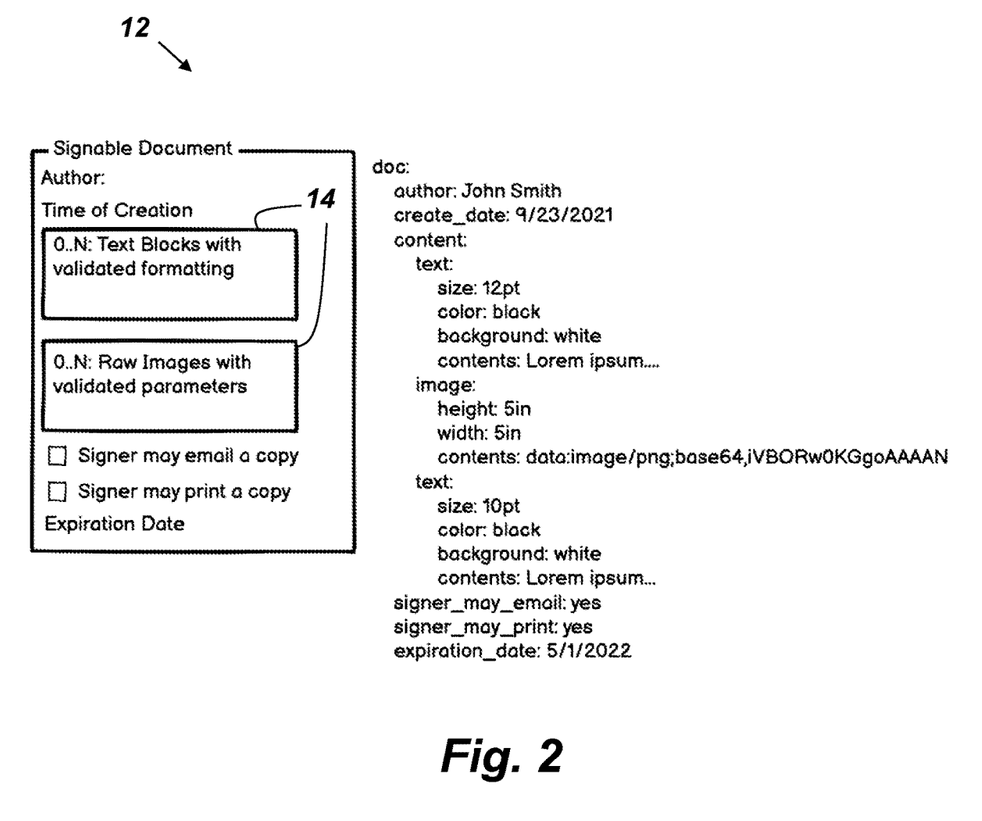
FIG. 2 is an illustration of an example data format.

FIG. 2 is an illustration of an example data format 12, laying out possible elements 14 of a signature. As part of the implementation of a computer-implemented system using an embodiment of method 10, those elements 14 would be presented in a uniform manner to users regardless of the type of device used to access the data, ensuring that everything to be signed is clearly presented to the user. In the example data format depicted in FIG. 2, signed documents are limited to text passages and images, with constraints on the image format, size and coloration of text. An implementation may for example want to limit text to black ink on white background and 12 pt. font universally, and that could be specified in the data format. Additionally, an implementation may specify a desirable viewable dimension for an image, or require that it have a minimum number of dots per inch (DPI). An implementation may label images automatically such that they are outlined and labeled e.g. "Image 1" so that the user can reference the text and images in a meaningful way. Finally, a data format might include entire other standards within its definition, such as the inclusion of an entire e.g. portable document format (PDF) document. This is a preferable approach because the user is ensured that he/she is signing the entirety of the document without confusion or doubt of the technical implementation. A data format may be persisted in any appropriate standard such as extensible markup language (XML), JavaScript object notation (JSON), and yet another markup language (YAML) to convey the valid pieces of a document. For example, in FIG. 2, the data format is in a YAML configuration.

Figure 3:
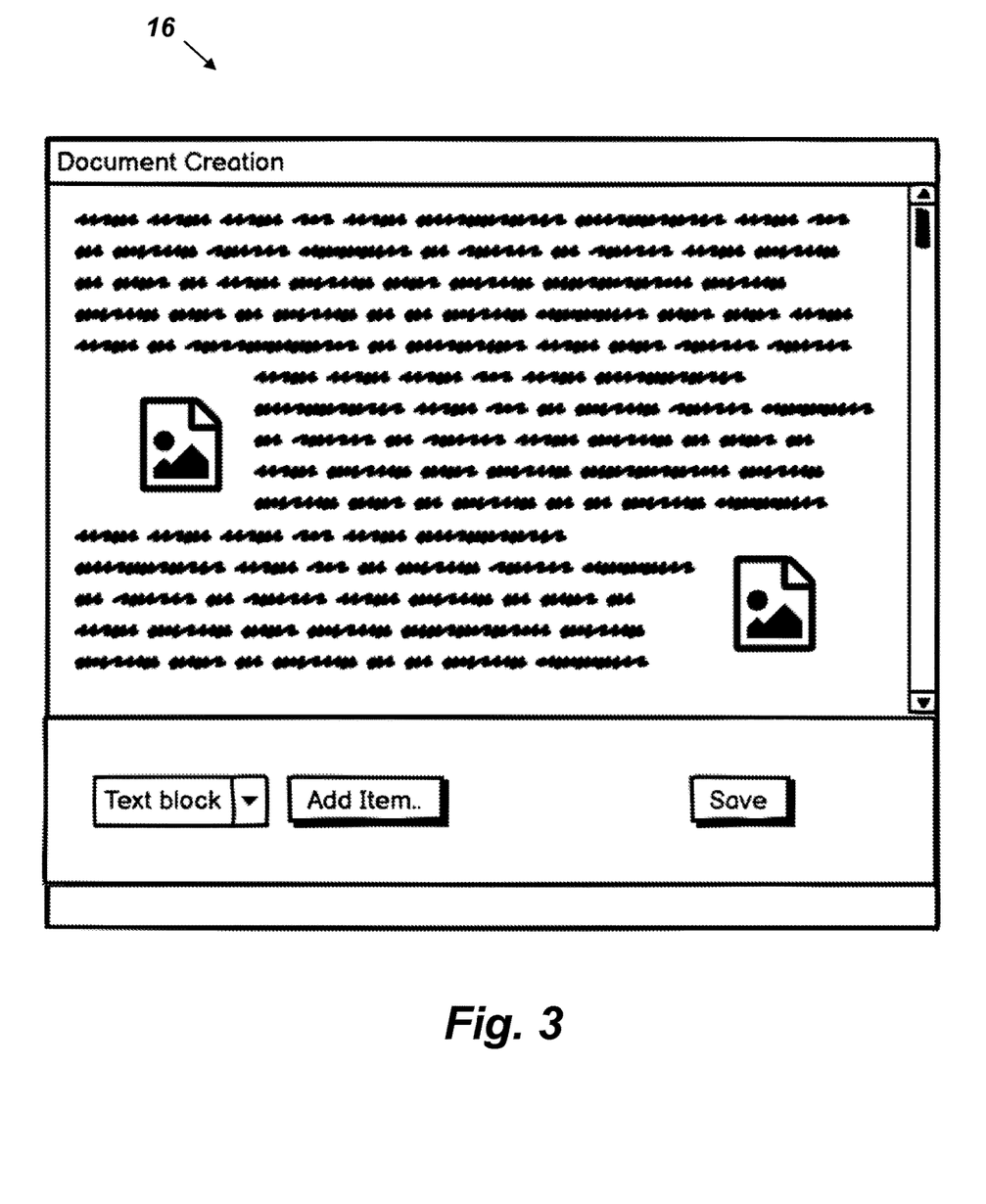
FIG. 3 is an illustration of an example document creation interface.
Figure 4:
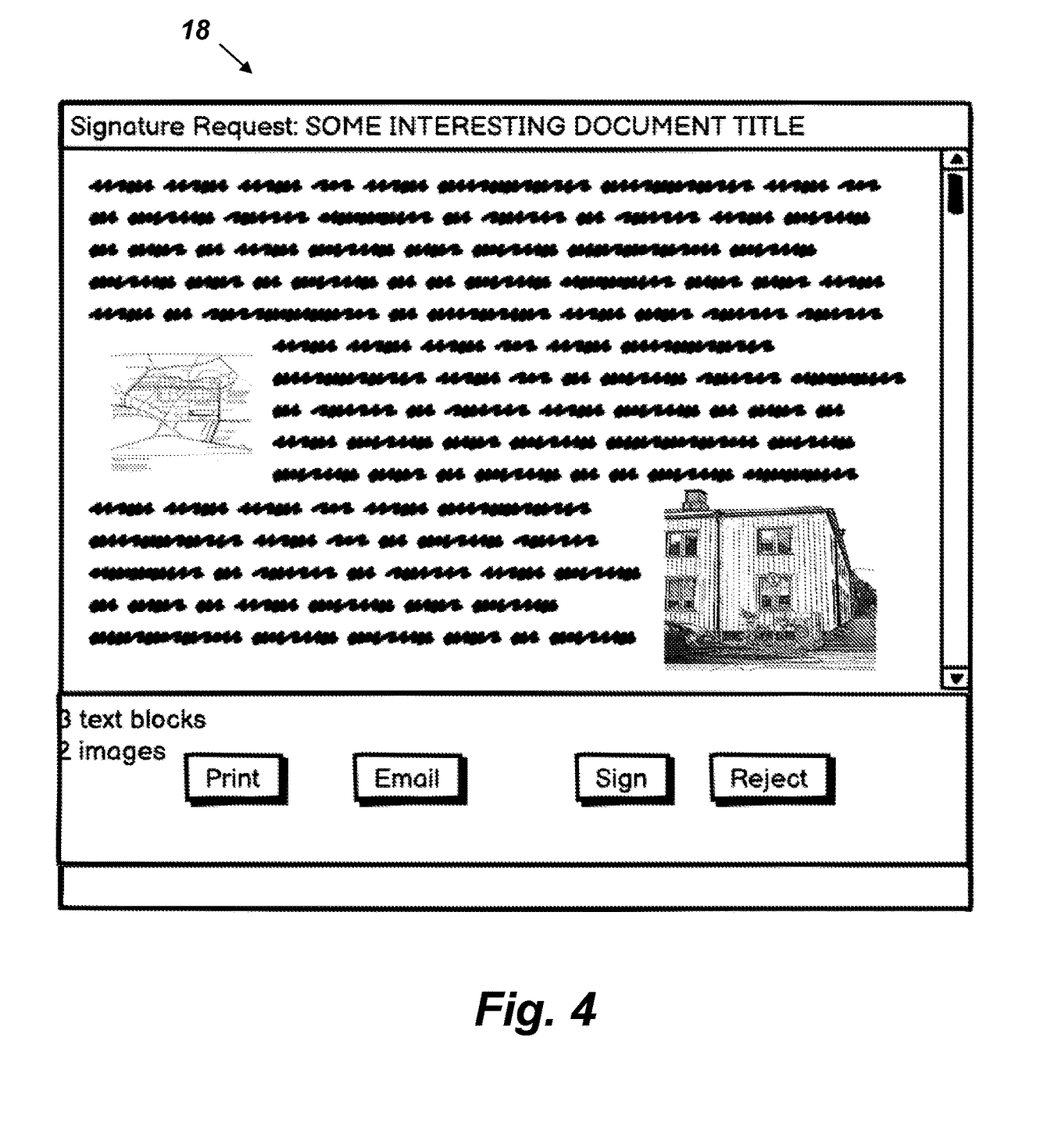
FIG. 4 is an illustration of an example signature interface

FIGS. 3 and 4 are respectively illustrations of an example document creation interface 16 and an example signature interface 18 that may be used in conjunction with method 10. The content of a document is controlled by the established data format and verified by the computer system implementing method 10. The document creation interface 16 may be implemented as an interactive web form, a plugin or template for current document editing software such as e.g. Adobe PDF, Microsoft Word, or even the underlying operating system (OS). Similarly an embodiment of the signature interface 18 could be implemented in a standalone kiosk such as at a medical provider, via a web application, or ideally in the underlying operating system itself. A tamper-proof embodiment of method 10 would require method 10 to be implemented on an underlying OS as the OS could prevent other processes with tampering with the interaction between document and user (as happens today with current digital signatures). The signature interface 18 may be presented to a user by the OS when a third party requires a signature on anything.

Figure 5:
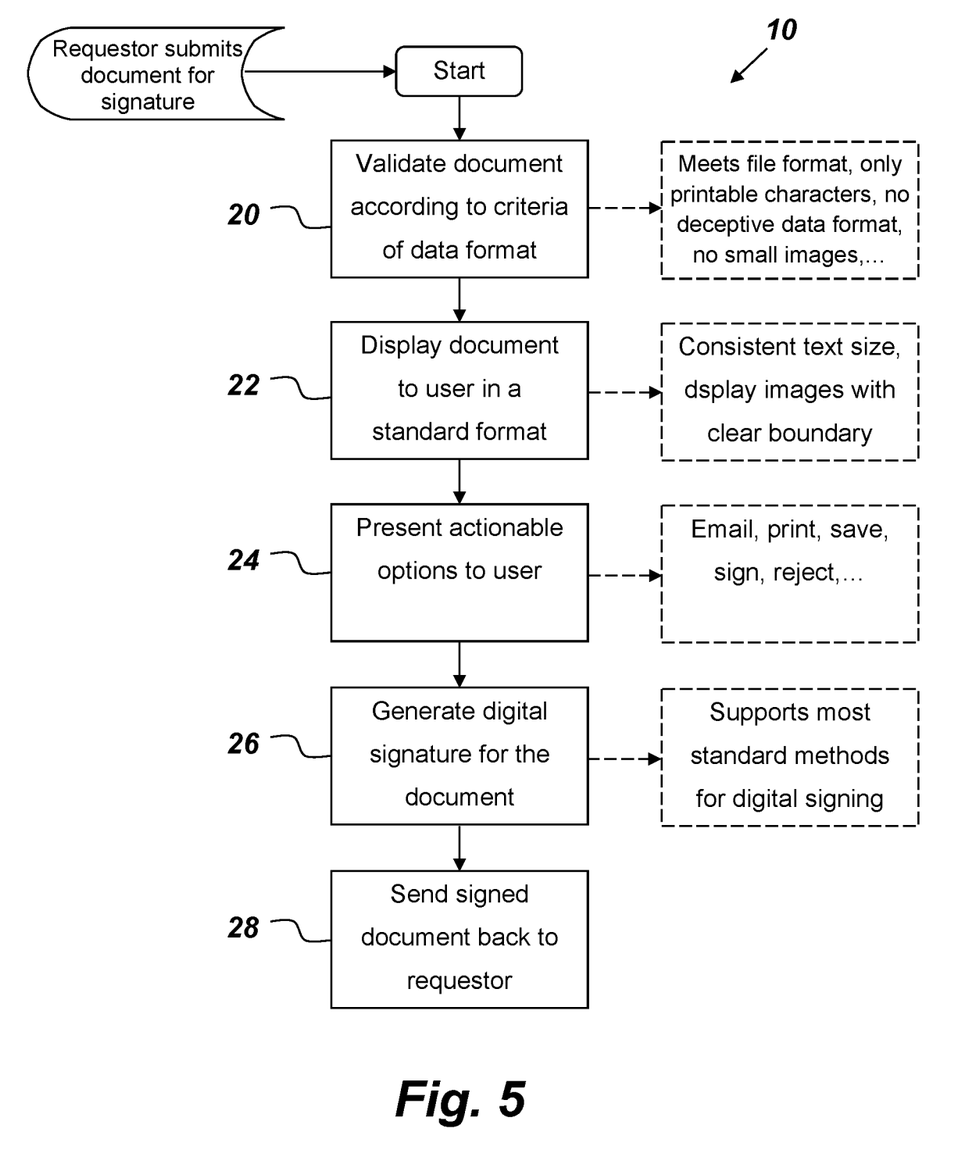
FIG. 5 is a flowchart.

FIG. 5 is a flowchart of another embodiment of method 10 that begins after a requestor has sent sign-able content (i.e., "the document") to a user (e.g., by network transmission or system application programming interface (API) call). Before the requestor-supplied document is shown the user, step 20 of this embodiment of method 10 first validates that the document complies with the established data format standard, which, depending on the embodiment, may consist of a limitation on the number of text, image, audio, etc content types. One data format example is depicted in FIG. 2. The data format might also indicate an existing document standard such as PDF, Word Document, Markdown, or others. The validation step is intended to ensure that content adheres to the data format standards before the document is presented and potentially accepted by the user. Filtering or validation might include any of one or more of the following:

- Ensuring that the document is in the correct file format;
- Ensuring that only printable characters are shown (no escape characters, special characters, hidden characters, no e.g. 'white on white text');
- Ensuring that no deceptive/data-hiding practices are occurring;
- Ensuring that format of the document adheres to readability standards;
- Ensuring accessibility standards are met; and
- Ensuring a standard format for images or other attachments such as: color depth, pixels per inch (PPI), min/max resolution, etc.

In an example validation, method 10 might accept only raw text (perhaps Markdown format for basic formatting) and only printable characters to ensure that the text presented is as clear as possible. Another example validation might, in addition to raw text, also accept images, but only in raw bitmap format, and within a certain image size constraint. Another example may perhaps accept PDF, but perform internal validation to ensure that text formatting is within acceptable ranges, and there are no 'hidden' payloads.

Still referring to FIG. 5, in the next step 22, the user is shown the document in a clear manner (e.g., FIG. 4). The user is free to browse/read the entirety of what the user is signing. In step 24, the user is presented with a number of options:

Print/Email/Save the document so that the user may (optionally) retain a copy of the agreement. There are potentially situations where this might not be desired, and this behavior can be configured to comply to unique legal or operational requirements, but the user is alerted to this before signing.

Sign the document.

Reject the document.

In step 26, the entirety of the document is used to generate a digital signature (e.g., via binary/string concatenation, hashing the entire document, etc), such that the signature protects the entirety of the document presented in step 24 without possibility for differences in what the users sees versus what the user signs. The key here is that the function that prepares the document for digital signature must contain the entirety of all data in the document, and this would be ideally enforced at the OS, browser, or driver level to ensure compliance. This digital signature may be performed via PKI, or perhaps simply taking an e-pen signature and using that image to generate a suitable cryptographic hash. (For example, attributes of the e-pen signature may be used to create a key that ties the signature to the document to prove that the e-pen signature was used to sign that particular document, but not another). In step 28, method 10 sends the entirety of the signed document back to the requestor alongside the newly-generated signature. To verify the signature, method 10 requires that the entirety of this signed document be checked against the digital signature, as opposed to a potentially smaller derived document as is the current practice. To put it more clearly: method 10 ensures that the entire document is protected by the signature, and no additions or deletions of the document are allowed. If a system/application/other entity wants to request a digital signature, it must provide a sign-able document in its entirety. This gives the user confidence that the entirety of the document that is presented for signature has been completely presented to the user and may be signed without fear that it may be subsequently modified.

Currently in some existing applications some subset of the entirety of a document is often used (e.g. column data without appropriate field headers that can be modified later or misunderstood) without the requirement to present to the user exactly what they are signing. Additionally, in the above described situations, often neither the user nor the document writer truly understands what is or is not protected by a digital signature, which can potentially cause a lot of damage if that signatures need to be relied on to resolve a matter. Documents that offer 'digital signatures' are broken if the information on them is not signature protected, and can be modified at will after the digital signature is applied.

Multiple methods of digital signing may be used in conjunction with method 10. One suitable example embodiment of method 10 operates in conjunction with PKI signature operation. An embodiment of method 10 may be implemented as a smartphone application to facilitate agreements between individuals by using a third party site to keep both a clearly written agreement and signatures on both sides. The steps of method 10 could be performed by an operating system or a web browser to ensure that an application always treats user signatures fairly. Method 10 solves one of the major technical security issues in digital signatures today.

Method 10 could, as a sensible precaution, also require signatures from document creators to ensure that both sides of an agreement are protected by non-repudiation as both signatures can be provably traced back to both the author and the signer. With other digital signing implementations, the user must trust the system to only sign what the user expects to be signed—there is no way for the user to truly check this, nor is there any burden on the system to include any portion of the data presented to the user in the signature. Method 10, on the other hand, solves the problem directly such that the user knows every bit of information the user signed, and inversely the user knows that information that was not displayed was not signed. Recently, most cryptographically-sound signature methods for browser-based signing have been replaced with "digital notary services" where instead of any cryptographic signature by the user at all the following happens:

The system generates its own signature and timestamp,

The system uses e.g. smart card authentication to validate that the user is present, and The system saves this signature as if it were a valid signature from the user.

There is a significant problem with this, however. In the case of a malicious actor with access to the system such as a cyber threat, malicious user or administrator, or other such person, the system can be made to store a record of signing that has no technical link to the actual user involved. There was a time when the user's smart card (or other) signature provided strong cryptographic proof that they indeed performed the action and, in the case of e.g. a Smart Card, made it nearly impossible to spoof. In the case of "digital notary services" all of that cryptographic proof is gone, and anyone with access to the underlying system may "make up" any records they deem fit. Method 10 directly solves this problem.

From the above description of method 10, it is manifest that various techniques may be used for implementing the concepts of method 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that method 10 is not limited to the particular embodiments described herein, but is capable of many embodiments without departing from the scope of the claims.

We claim:

1. A method for increasing validity of digital signatures comprising the following steps:

receiving with an operating system running on a computer operated by a user, a request from a browser to have the user apply a digital signature to a document, wherein the document originates from a website;

verifying with the operating system that the document complies with a predefined ruleset before the user is given an opportunity to apply the digital signature, wherein the predefined ruleset prescribes font colors;

if the document does not comply with the predefined ruleset, declining to present the document to the user for the digital signature;

if the document does comply with the predefined ruleset, presenting the user with the document on a user-computer interface in such a way that the document's entire content is completely visible and reviewable by the user;

upon receiving instruction from the user to sign the document, generating the digital signature according to public key infrastructure (PKI) to create a digitally-signed document that replicates the document in its entirety as presented to the user in the presenting step without any additions or deletions to the document but for the addition of the digital signature;

enabling the user to perform one or more of printing, sharing, and saving the digitally-signed document in a memory store; and sending the digitally-signed document to the browser.

2. The method of claim 1, wherein the steps are performed in the browser only without requiring any native digital-signature-related software to be installed on the user's computer.

3. The method of claim 1, wherein the predefined ruleset requires that the document include only raw text.

4. The method of claim 1, wherein the predefined ruleset requires that the document include only raw text and bitmap format images.

5. The method of claim 1, wherein the predefined ruleset includes portable document format (PDF) only once an internal validation is performed to ensure that text formatting is within acceptable ranges, and there are no 'hidden' payloads.

6. The method of claim 1, wherein the step of generating the digital signature comprises using binary/string concatenation to protect the entirety of the document.

7. The method of claim 1, wherein the step of generating the digital signature comprises hashing the entire document such that the digital signature protects the entirety of the document.

8. The method of claim 1, wherein the step of generating the digital signature comprises using attributes of an e-pen signature to create a key that ties the digital signature to the digitally-signed document as evidence that the e-pen signature was used to sign the digitally-signed document, but not another.

9. A method for increasing validity of a digital signature comprising the following steps:

loading a configuration file on an operating system running on a computer, wherein the configuration file is configured to force public key infrastructure (PKI) on documents that require the digital signature from a user of the computer;

receiving with the operating system, a request to have the user apply the digital signature to a given document;

verifying, with the operating system, that the given document complies with a predefined ruleset before the user is given an opportunity to apply the digital signature to the given document, wherein the predefined ruleset prescribes font size, color, and legibility standards, and wherein the predefined ruleset prohibits inclusion of data in the given document that is not explicitly defined and allowed by the predefined ruleset;

presenting the user with the given document on a user-computer interface in such a way that an entire content of the given document is completely reviewable by the user only if the given document complies with the predefined ruleset;

upon the operating system receiving instruction from the user to sign the given document, generating the digital signature according to public key infrastructure (PKI) thereby creating a digitally-signed document that replicates the entire content of the given document, as presented to the user in the presenting step;

enabling the user to perform one or more of printing, sharing, and saving the digitally-signed document in a memory store; and sending the digitally-signed document to a browser.

10. The method of claim 9, wherein the request to have the user apply the digital signature to a given document comes from a website.

11. The method of claim 10, wherein the digitally-signed document is protected such that once the digital signature is generated no content changes may be made to the digitally-signed document.

12. The method of claim 11, wherein the digitally-signed document is further protected such that any future distribution of the digitally-signed document is subject to distribution limitations.

13. The method of claim 12, wherein the distribution limitations include an expiration date after which the digitally-signed document will no longer be readable.

14. The method of claim 12, wherein the distribution limitations include limiting the distribution of the digitally-signed document to a predefined list of recipients.

15. The method of claim 9, wherein the predefined ruleset is implemented in a language selected from a group consisting of Extensible Markup Language (XML), JavaScript Object Notation (JSON), and Yet Another Markup Language (YAML).

* * * * *